United States Patent
Triebel et al.

(10) Patent No.: US 11,742,642 B2
(45) Date of Patent: Aug. 29, 2023

(54) CABLE FIXING DEVICE FOR CONTAINER HANDLING SYSTEM AND METHOD FOR SETTING A MINIMUM BENDING RADIUS FOR A CONNECTING CABLE OF A CONTAINER HANDLING SYSTEM

(71) Applicant: Krones AG, Neutraubling (DE)

(72) Inventors: Joerg Triebel, Neutraubling (DE); Reinhard Ortner, Neutraubling (DE); Robert Scheibenpflug, Neutraubling (DE)

(73) Assignee: Krones AG, Neutraubling (DE)

( * ) Notice: Subject to any disclaimer, the term of this patent is extended or adjusted under 35 U.S.C. 154(b) by 498 days.

(21) Appl. No.: 17/045,038

(22) PCT Filed: Jan. 10, 2019

(86) PCT No.: PCT/EP2019/050582
§ 371 (c)(1),
(2) Date: Apr. 12, 2021

(87) PCT Pub. No.: WO2019/192759
PCT Pub. Date: Oct. 10, 2019

(65) Prior Publication Data
US 2021/0226428 A1    Jul. 22, 2021

(30) Foreign Application Priority Data
Apr. 5, 2018   (DE) .................... 10 2018 108 118.9

(51) Int. Cl.
*H02G 3/04*   (2006.01)
*B67C 3/22*   (2006.01)
*B67C 7/00*   (2006.01)

(52) U.S. Cl.
CPC ........... *H02G 3/0456* (2013.01); *B67C 3/225* (2013.01); *B67C 7/004* (2013.01); *H02G 3/0418* (2013.01);
(Continued)

(58) Field of Classification Search
None
See application file for complete search history.

(56) References Cited

U.S. PATENT DOCUMENTS 4,378,473 A * 3/1983 Noorigian .......... B65H 75/4428
439/4
5,448,015 A * 9/1995 Jamet .................... H04Q 1/064
174/101
(Continued)

FOREIGN PATENT DOCUMENTS

DE   602004001466       6/2007
DE   602004001466 T2    6/2007
(Continued)

OTHER PUBLICATIONS

International Preliminary Report on Patentability/Translation of Written Opinion from the International Bureau of WIPO dated Oct. 6, 2020 for International Application No. PCT/EP2019/050582.
(Continued)

*Primary Examiner* — Krystal Robinson
(74) *Attorney, Agent, or Firm* — Sean F. Mellino (57) ABSTRACT

The invention relates to a cable fixing device for a container handling system and to a method for setting a minimum bending radius for a connecting cable of a container handling system. The cable fixing device comprises a main body, a cable guide which is arranged around a part of the main body, and a cover for covering an end of the cable guide in such a way that a connecting cable, which is pre-assembled with plug-in devices at both ends, can be
(Continued)

introduced between the cover and the cable guide. The cable guide is configured at its other end for fixing of the connecting cable in such a way that a looping angle of the cable fixing device and connecting cable can be set variably.

11 Claims, 7 Drawing Sheets

(52) U.S. Cl.
CPC .. *B67C 2003/227* (2013.01); *B67C 2007/006* (2013.01); *B67C 2007/0066* (2013.01)

(56) References Cited

U.S. PATENT DOCUMENTS

| | | | | |
|---|---|---|---|---|
| 6,305,632 | B1* | 10/2001 | Hwang | B65H 75/486 |
| | | | | 242/380 |
| 6,330,168 | B1* | 12/2001 | Pedoeem | H05K 7/1448 |
| | | | | 248/220.21 |
| 6,921,053 | B1* | 7/2005 | Heck | H02G 3/0456 |
| | | | | 248/50 |
| 7,959,444 | B2* | 6/2011 | Corless | H01R 13/72 |
| | | | | 439/906 |
| 9,928,949 | B1* | 3/2018 | Mchatet | H02G 3/0456 |
| 2016/0105009 | A1* | 4/2016 | Borer | H02G 3/04 |
| | | | | 385/136 |

FOREIGN PATENT DOCUMENTS

| | | |
|---|---|---|
| DE | 102011080082 A1 | 1/2013 |
| DE | 102011080082 | 2/2013 |
| DE | 202015100659 | 5/2016 |
| DE | 202015100659 U1 | 6/2016 |
| EP | 1602518 | 12/2005 |
| EP | 1602518 A2 | 12/2005 |
| JP | 2015213418 | 11/2015 |
| TW | 201622282 | 6/2016 |
| WO | 2012089208 | 7/2012 |
| WO | 2012089208 A2 | 7/2012 |

OTHER PUBLICATIONS

International Search Report from the European Patent Office dated Apr. 2, 2019 for International Application No. PCT/EP2019/050582.

Written Opinion from the European Patent Office dated Apr. 2, 2019 for International Application No. PCT/EP2019/050582.

* cited by examiner

CABLE FIXING DEVICE FOR CONTAINER HANDLING SYSTEM AND METHOD FOR SETTING A MINIMUM BENDING RADIUS FOR A CONNECTING CABLE OF A CONTAINER HANDLING SYSTEM

CROSS-REFERENCE TO RELATED APPLICATIONS

This application a 371 National Stage application of International Application No. PCT/EP2019/050582 filed on Jan. 10, 2019, which claims foreign priority to German (DE) Application Ser. No. 10 2018 108 118.9 filed on Apr. 5, 2018, the contents of both of which are incorporated herein by reference in their entireties.

BACKGROUND OF THE INVENTION

Field of the Invention

The present invention relates to a cable fixing device for a container handling system and a method for setting a minimum bending radius for a connecting cable of a container handling system.

Description of the Prior Art

In a container handling system, containers for the beverage industry, for example, are manufactured and/or filled and/or packed. The container handling system can comprise at least one container handling machine, such as a blow molding machine and/or, a cleaning machine and/or, a filling machine and/or, a labeling machine and/or, a packaging machine and/or an inspection machine. Containers may be in particular cans, glass bottles or plastic bottles. The containers are transported in the respective container handling machine and between the container handling machines with a transport device.

In particular in the labeling machine and/or the filling machine and/or a closer for closing the containers, the containers are handled at a large number of handling stations. Here, for example, the containers are accommodated by turntables and rotated around their axis, a filling valve for filling a product into the container is opened or closed as required or a closure is turned on the container, etc. For this purpose, drive devices are used that can be supplied with electricity via an electrical cable. The cable is designed, for example, as a flat cable which is guided from one drive device to another drive device and is pre-assembled for this purpose at its both ends with a plug connection.

The problem with this is, on the one hand, that the installation space for laying cables is limited by a rotating guard on the container table or a standing guard on the machine table. In this case, neither the protection on the container table nor the protection on the machine table should be touched by the electrical cable, in order to avoid the destruction of the cable and the resulting machine failure.

On the other hand, it is problematic in this connection that the labeling machine and/or the filling machine and/or the closer are to be built of different sizes depending on the customer's request or space conditions. Depending on the machine, this results in different distances between the individual drive devices of the machines. Following this, different lengths of the connecting cables between the individual drive devices must be kept for each case. This causes high costs with regard to the storage required as a result, the variety of individual parts to be kept available over the entire life time of the machine, parts list maintenance and, due to the many different individual variants with smaller quantities, higher cable prices. If the lengths of the connecting cables are not very different, assembly errors can occur in that a specified minimum bending radius for laying the connecting cables is not fulfilled.

SUMMARY OF THE PRESENT INVENTION

It is therefore the object of the present invention to provide a cable fixing device for a container handling system and a method for setting a minimum bending radius for a connecting cable of a container handling system, with which the aforementioned problems can be solved. In particular, a cable fixing device for a container handling system and a method for setting a minimum bending radius for a connecting cable of a container handling system are to be provided, in which, with a small number of variants of the connecting cables, even with different distances between the drive devices to be connected with a cable, a correct and therefore fail-safe routing of the connecting cables in the container handling system is possible.

The object is achieved by a cable fixing device for a container handling system according to claim 1. The cable fixing device comprises a base body, a cable guide which is positioned around a part of the base body, and a cover for covering an end of the cable guide in such a way that a connecting cable, which is pre-assembled with a plug device at each one of its both ends, can be introduced between the cover and the cable guide, wherein the cable guide is configured at its other end for fixing of the connecting cable in such a way that a wrap angle of the cable fixing device and the connecting cable can be set variably.

The structure of the cable fixing device described ensures that a connecting cable for different distances between the individual drive devices of the machines can be laid in the container handling system in accordance with the regulations and thus fail-safe. Herein, the described cable fixing device for the connecting cables can significantly reduce the large variety of lengths required up to now. In addition, production downtimes due to assembly errors in the connecting cable can be safely avoided, which increases the availability of the machine and thus the container handling system.

The cable fixing device is configured in such a way that the cable fixing device realizes, only together with the connecting cable, the necessary fixing for maintaining the function. As a result, no external fastening positions on the drive device or the container table or the machine table are required to fix the connecting cable.

As a further advantage, the cable fixing device described stabilizes in particular connecting cables which are long in comparison to the actual distance between the drive devices in their direction between the drive devices.

In addition, the described cable fixing device is not intricate to handle during assembly. As a result, the manufacture and/or commissioning of the container handling system can be shortened and thus made more cost-effective.

Advantageous further developments of the container-processing system are given in the dependent claims.

According to one embodiment, the base body and the cable guide have a shape which enforces a minimum bending radius of a connecting cable guided in the cable guide in case the cable fixing device and the connecting cable are fixed to one another.

In a special embodiment, the base body has an inner ring. Additionally or alternatively, the cable guide for setting the wrap angle comprises at least one recess for accommodating a clip or a cable tie for fixing the cable fixing device and the connecting cable to one another. Additionally or alternatively, the at least one recess for accommodating the clip or the cable tie has a marking to indicate the wrap angle.

According to one embodiment, the base body comprises a nose-shaped projection or a hook-shaped projection for the cable fixing device to rest on one of the plug devices for strain relief. A through opening can be provided in the nose-shaped projection.

It is conceivable that the cable fixing device is built up in layers.

The cable fixing device described above can be part of a container handling system which also has at least one container handling machine for handling containers using at least two drive devices, wherein the at least one cable fixing device is mounted on a connecting cable for connecting the at least two drive devices. Herein, the at least two drive devices can be spaced from one another in a predetermined range, wherein a plug device is pre-assembled to each of the two ends of the connecting cable which connects two drive devices, and wherein a cable fixing device is fixed to the connecting cable at at least one of the plug devices in order to create a loop in the connecting cable between the plug devices.

The at least one container handling machine may have or is a blow molding machine and/or, a filling machine and/or, a closer and/or, an equipping machine and/or, an inspection machine.

The object is also achieved by a method for setting a minimum bending radius for a connecting cable of a container handling system according to claim 10. Herein, the connecting cable is pre-assembled with a plug device at each one of its both ends, in order to drive two drive devices of the container handling system, which are spaced apart from one another in a predetermined range, the method being carried out with a cable fixing device which comprises a base body, a cable guide and a cover and wherein the method comprises the steps of inserting the connecting cable at one of its two ends between the cover and the cable guide, which is suitably covered at one end by the cover for the insertion of the connecting cable and is at least partially positioned around the base body, and fixing the other end of the cable guide and the connecting cable to one another such that a wrap angle of the cable fixing device and the connecting cable are set variably.

Herein, the step of fixing in the connecting cable can produce a loop between the plug devices.

The method achieves the same advantages that are mentioned above with regard to the cable fixing device.

Further possible implementations of the invention may also comprise combinations of features or styles described above or in the following by reference to the embodiments, even if they are not explicitly mentioned. Herein, the person skilled in the art may also add single aspects as improvements or additions to the respective basic form of the invention.

BRIEF DESCRIPTION OF THE DRAWINGS

In the following, the invention is described in more detail by means of embodiments and with reference to the appended drawing Figures, wherein.

DETAILED DESCRIPTION OF THE PRESENT INVENTION

In the figures, the same or functionally same elements are provided with the same reference signs unless given otherwise.

Figure 1:
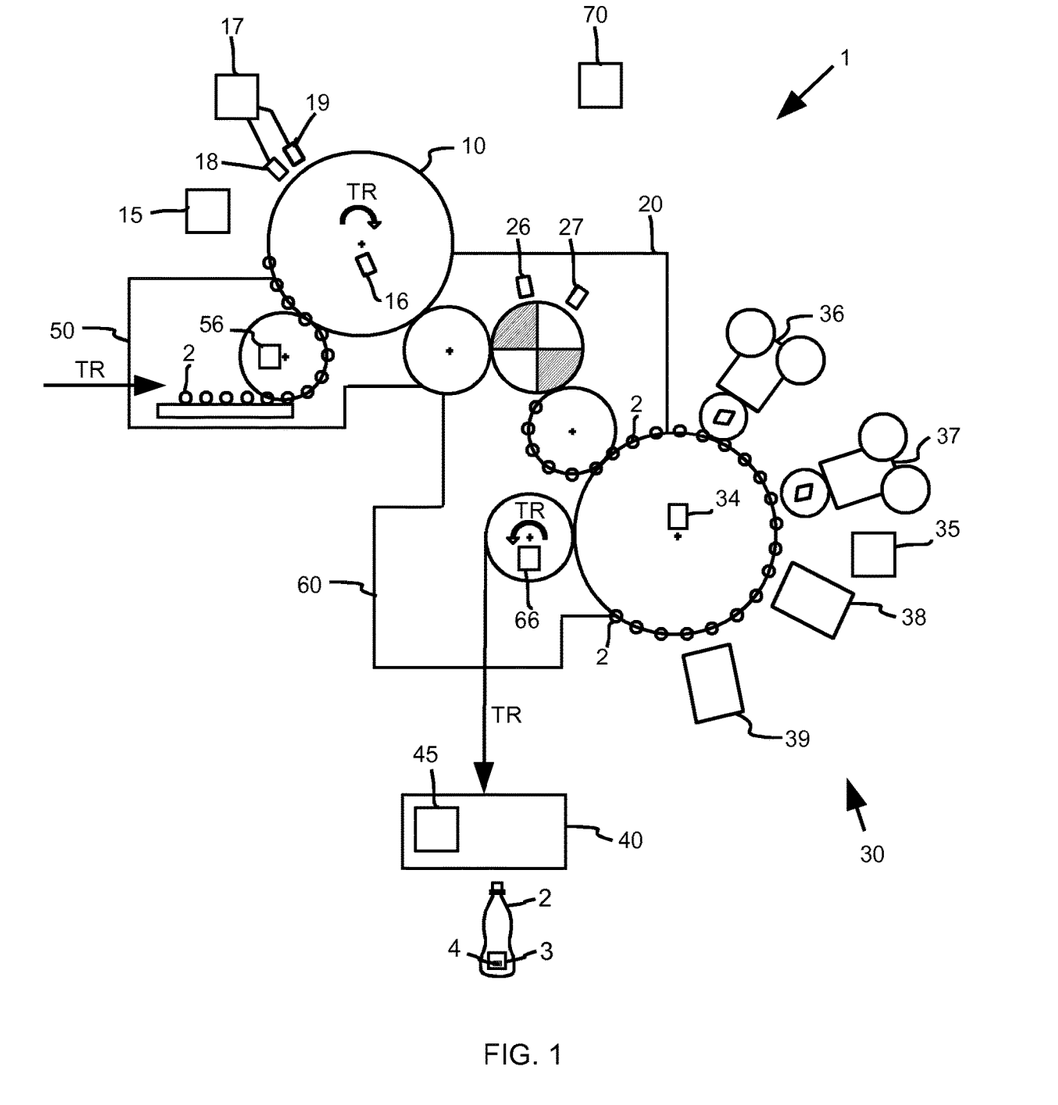
FIG. 1 shows a schematic block diagram of a container handling system according to a first embodiment.

FIG. 1 shows schematically a container handling system 1 for the handling of containers 2, which can be bottles, cans, boxes, etc., which can be provided with a schematically shown label 3 and/or an arbitrary printing 4 as identification.

For this purpose, the container handling system 1 comprises, as an example, a first to fourth container handling machine 10, 20, 30, 40 which are coupled to one another. However, the container handling system 1 can alternatively comprise any number and/or combination of the container handling machines 10, 20, 30, 40, that is to say at least one of the container handling machines 10, 20, 30, 40. In FIG. 1, for the sake of simplicity, not all containers 2 are shown or given a reference number.

The container 2 is, for example, a container that may have a maximum capacity of approx. 0.33 liters or 0.5 liters or 1.5 liters etc. Of course, other capacities are conceivable, as is to be appreciated. The shape of the container 2 may be freely selected. In addition, the material of the container 2 may be freely selected, such as for example, be selected from one or more of glass, plastic, aluminum, etc.

In the inlet of the first container handling machine 10, a transport device 50 is provided which, by means of driving by a drive device 56, supplies containers 2 lined up in a row or as a container flow to the first container handling machine 10. The transport direction TR of the containers 2 is indicated in FIG. 1 by arrows and also results from the row of containers 2 along the container handling machines 10, 20, 30, 40. Between the third and fourth container handling machines 30, 40, the containers 2 are transported with a transport device 60 by means of driving by a drive device 66. The container handling machines 10, 20, 30, 40 and the transport devices 50, 60 in the example in FIG. 1 may be each designed as a multifunction star or carousel.

In the example of FIG. 1, the container handling machines 10, 20, 30, 40 and the transport devices 50, 60 form a block which is very compact. In addition, the fourth container handling machine 40 can be positioned in the vicinity or adjacent to the block comprising the container handling machines 10, 20, 30 and the transport devices 50, 60, even if this is not shown in FIG. 1. However, the container handling system 1 and the container handling machines 10, 20, 30, 40 are not limited to this and can instead be lined up in a separate configuration.

In the example of FIG. 1, the first container handling machine 10 is a filling machine which is controlled by a control device 15. Herein, by driving by a drive device 16, the containers 2 are moved to filling valves (not shown) with which at least one product is filled from at least one filling tank 17 into the containers 2 supplied by the transport device 50. The filling valves may be actuated by means of drive devices 18, 19. The product can be, for various examples, food, in particular a drink, etc., a cleaning agent, a cosmetic product, a powder or piece goods, in particular beads, etc., or any other product that can be filled into containers 2.

In the example of FIG. 1, the second container handling machine 20 is a closer, which is connected downstream of the filling machine or first container handling machine 10. In the closer (as the second container handling machine 20), the containers 2 are provided with a closure cap by means of, for example, at least one screw drive device 26, 27, and thereby closed.

In the example of FIG. 1, the third container handling machine 30 is an equipment machine which equips the containers 2 filled by the filling machine or first container handling machine 10 and then the containers 2 closed with the second machine 20 with an identification, for example by the label 3 and/or any printing 4. For this purpose, the equipment machine in the example of FIG. 1 has a drive device 34 which, under the control of a control device 35, drives a carousel for transporting the containers 2 past four different modules, which are in particular equipment modules 36, 37, 38, 39. For example, the equipment module 36 is a labeling and/or printing unit, the equipment module 37 is a labeling unit and the equipment modules 38, 39 are configured as printing units. Accordingly, the label 3 can be a prefabricated label. However, the label 3 can alternatively initially be printed at least partially by means of the printing 4 by means of a labeling and/or printing unit. Herein, all combinations of at least partial printing on a label 3 or at least partial printing directly on the container 2 are possible.

Alternatively, however, the equipment modules 35 to 38 are each configured in the same way, so that all containers 2 are provided with the same type of identification, in particular labels 3. Any combinations of equipment modules 35 to 38 and thus types of identification, in particular types of labels, are conceivable and realizable.

After the third container handling machine 30, the equipment machine in the example selected above, the containers 2 are supplied to the fourth container handling machine 40 by means of the transport device 60, as already mentioned above.

The fourth container handling machine 40 is, for example, a packaging machine in which the containers 2 are packed together in predetermined types and/or packaging sizes under the control of a control device 45, for example as a bundle comprising two containers 2 or four containers 2, with or without a handle, etc., or in a box or carton, etc.

The container handling system 1 is controlled by a control device 70. The previously mentioned control devices 15, 35, 45 and other control devices not mentioned for the machines 10, 20, 30, 40 and transport devices 50, 60 are subordinate to the control device 70 in terms of control.

Figure 2:
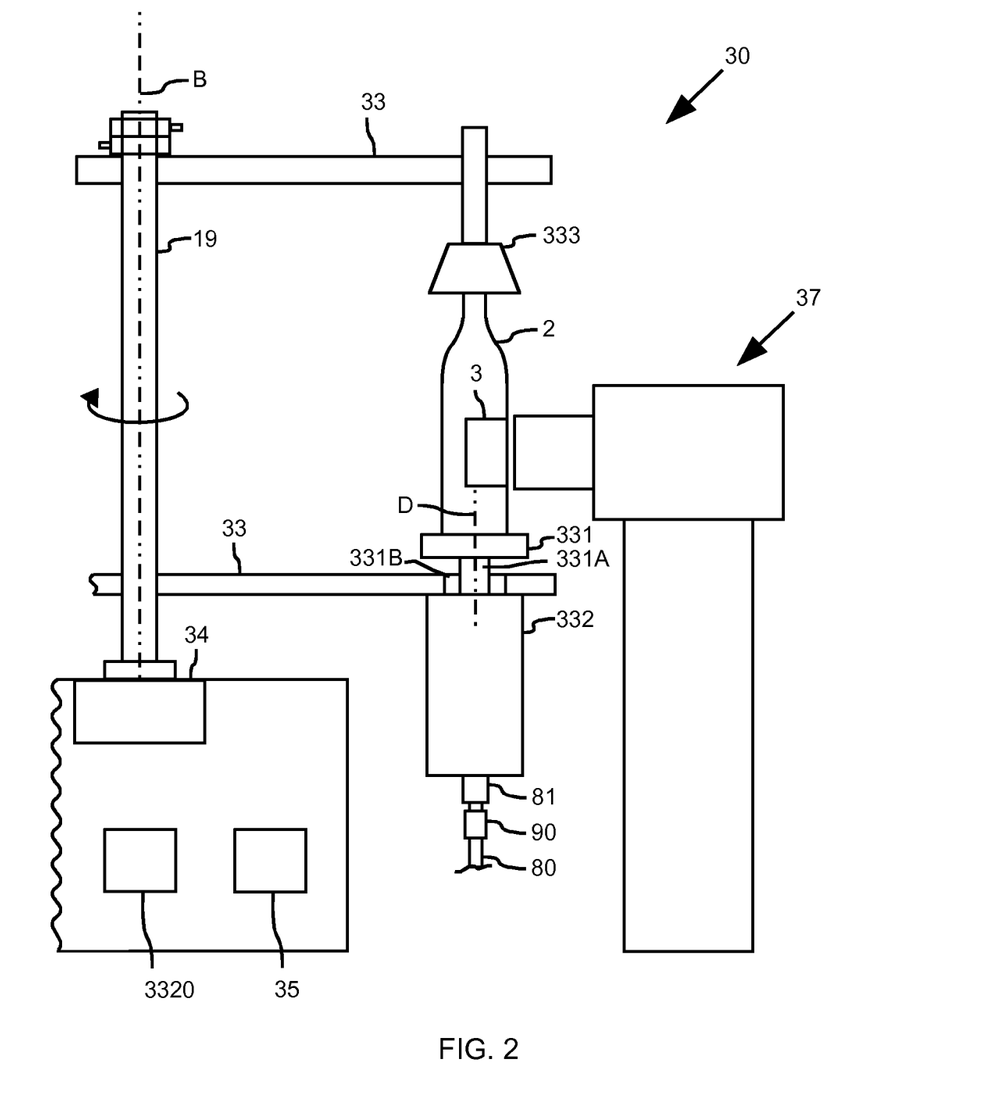
FIG. 2 shows a partial side view of a labeling machine for a container handling system according to the first embodiment.

As an example, FIG. 2 shows a side view of the labeling machine as the third container handling machine 30 of FIG. 1 in more detail. Accordingly, the labeling machine or third container handling machine 30 has a rotatable transport carousel 33, the non-rotatably positioned control device 35 and the equipment module 37 configured as a labeling unit. The transport carousel 33 serves to accommodate turntables 331, each with an associated turntable direct drive device 332 and an associated centering bell 333. The turntables 331 together with the associated centering bell 333, respectively, form container receptacles 331, 333 which are positioned on the outside of the circumference of the transport carousel 33 and rotate with the transport carousel 33. For the sake of clarity, only one container receptacle 331, 333 with a direct drive device 332 is shown here. On the circumference of the transport carousel 33, however, there is a plurality of such arrangements 331, 332, 333 at regular angular intervals. A shaft sealing system in which at least one sealing ring 331B rests on a motor shaft 331A of the turntable direct drive device 332 is used to protect the turntable direct drive device 332 against contamination.

Each turntable 331 can be individually driven by a direct drive device 332 in a rotation about its turntable axis D. For this purpose, the direct drive device 332 is connected by means of a connecting cable 80 (schematically partially shown) to a further direct drive device 332, (not shown in FIG. 2), which is positioned adjacent to the transport carousel 33, as described above. A cable fixing device 90 is mounted on the connecting cable 80 in the vicinity of its first end, at which a plug-in device or plug device 81 is provided. This is described in more detail with reference to FIGS. 3 to 14.

The transport carousel 33 can be rotated about its carousel axis B by means of the drive device 34. The drive device 34 is controlled via the control device 35, as already described with reference to the first embodiment. In addition, a control device 3320 is provided for controlling the direct drive device (s) 332.

During operation, one of the containers 2 is clamped between a turntable 331 and the associated centering bell 333 and is guided past the equipment module 37 by the rotation of the transport carousel 33 about the carousel axis B. In labeling, the containers 2 are rotated in a defined manner around the turntable axis D by means of the direct drive device 332, so that the label 3 is attached as evenly as possible to the container circumference. When passing the labeling unit or equipment module 37, the container receptacles are pivoted synchronously with the application of the label 3, so that the labels 3 are attached as evenly as possible to the circumference of the container 2. Herein, each of the turntables 331 can be rotated individually with a turntable direct drive device 332. Thus, each turntable 331 can be individually controlled by the machine control or control device 35 can be controlled for the labeling process and can thus be adapted particularly flexibly to different types of labels and containers. However, a rotation for transferring the label 3 may be optional; alternatively, the containers 2 may be rotated during transport between individual labeling units 37 and then adjusted for labeling.

Optionally, an inspection machine is additionally or alternatively provided, which may be constructed very similarly to the labeling machine of FIG. 2. However, in the case of an inspection machine, instead of the equipment module 37 of FIG. 1 or FIG. 2, there is an inspection module which can in particular and for example be configured as a camera. The inspection machine can be used in particular for the inspection of empty containers, at least partially filled containers 2, containers already closed by the closer 20, etc.

In operation of the inspection machine, one of the containers 2 is clamped between the turntable 331 and the associated centering bell 333 and is guided past the inspection module by the rotation of the transport carousel 33 about the carousel axis B. When inspecting with the inspection module, the containers 2 are rotated in a defined manner around the turntable axis D by means of the direct drive device 332, so that the containers 2 can be examined for defects as uniformly as possible from all sides. Herein, the container receptacles and the turntable direct drive devices 332 are controlled by the control device 3320, as described above.

Figure 3:
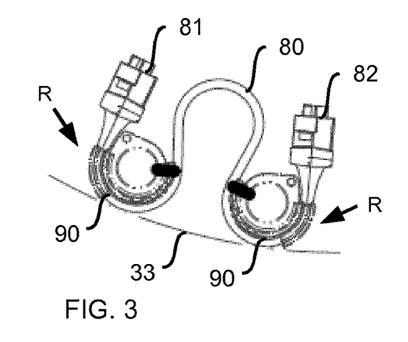
FIG. 3 to FIG. 8 each show a view of a special assembly variant for a connecting cable on a machine of the container handling system using at least one cable fixing device according to the first embodiment.
Figure 4:
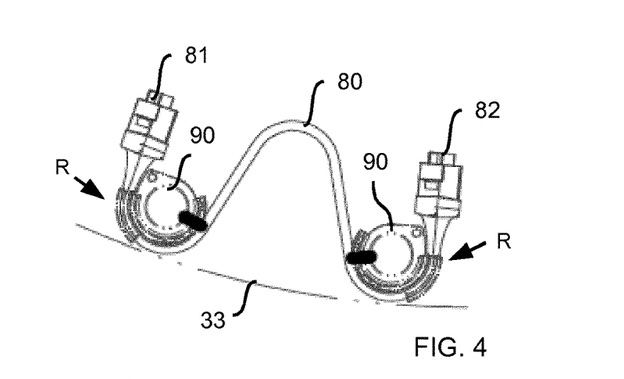
Figures 5, 6:
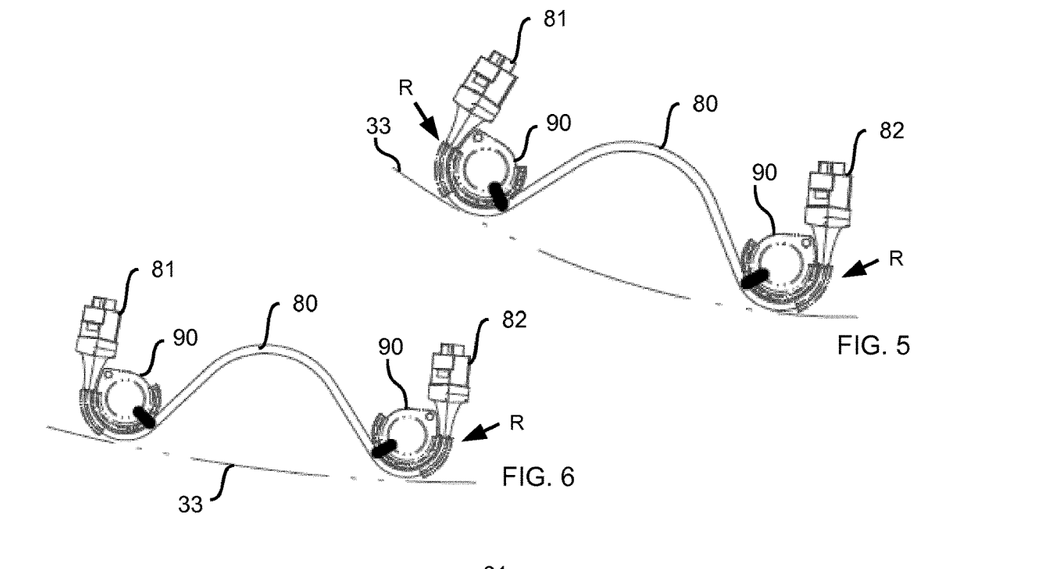

FIGS. 3 to 8 each illustrate different types of laying for the connecting cable 80, which can connect the respective drive device 332 of FIG. 3 to a further drive device 332 on the transport carousel 33. Alternatively, the connecting cable 80 can be used to connect the electrical connections for the drive devices 18, 19 of FIG. 1. Alternatively, the connecting cable 80 can be used to connect the electrical connections for the drive devices 26, 27 of FIG. 1. Of course, the connecting cable 80 can be used for other devices of the container handling system 1, even if these are not shown or described here.

The connecting cable 80 is pre-assembled at both ends for a plug connection by connecting a first plug device 81 and a second plug device 82 to the connecting cable 80 in the example of FIGS. 3 to 8. In the example shown here, the connecting cable 80 is a flat cable in which the individual wires of the connecting cable 80 are positioned in a row next to one another, as may be known. However, the following principle can be applied, as may be necessary, to a cable in which the individual wires of the connecting cable 80 are positioned as a bundle against each other.

According to FIGS. 3 to 8, at least one cable fixing device 90 is mounted on the connecting cable 80. More precisely, two cable fixing devices 90 are mounted in the laying type according to FIGS. 3 to 6, whereas in the laying type according to FIGS. 7 and 8 only one cable fixing device 90 is mounted.

The connecting cables 80 of the laying types shown in FIGS. 3 to 8 may be all of the same length. However, the wrap angle with which the connecting cable 80 wraps around a cable fixing device 90 is selected differently in each case. The wrap angle of connecting cable 80 and a cable fixing device 90 is greatest in the laying type of FIG. 3. In the laying type of FIG. 8, the wrap angle of connecting cable 80 and cable fixing device 90 is the smallest.

The shown attachment of the cable fixing device(s) 90 to the respective connecting cable 80 ensures, however, in all the laying types shown of FIGS. 3 to 8, that the connecting cables 40 are securely fixed to the drive devices 332 of FIG. 2 in a secure position (without a rotation of a part of the container handling system 1, and that may impair the laying of the connecting cable that is performed in accordance with regulations). In such a safe position, the connecting cables 80 both meet at least the minimum bending radius for laying the connecting cable 80 and the connecting cables 80 do not touch any machine parts that could damage the connecting cable 80 or loosen the connection between the drive devices 332 according to FIG. 2.

Figure 9:
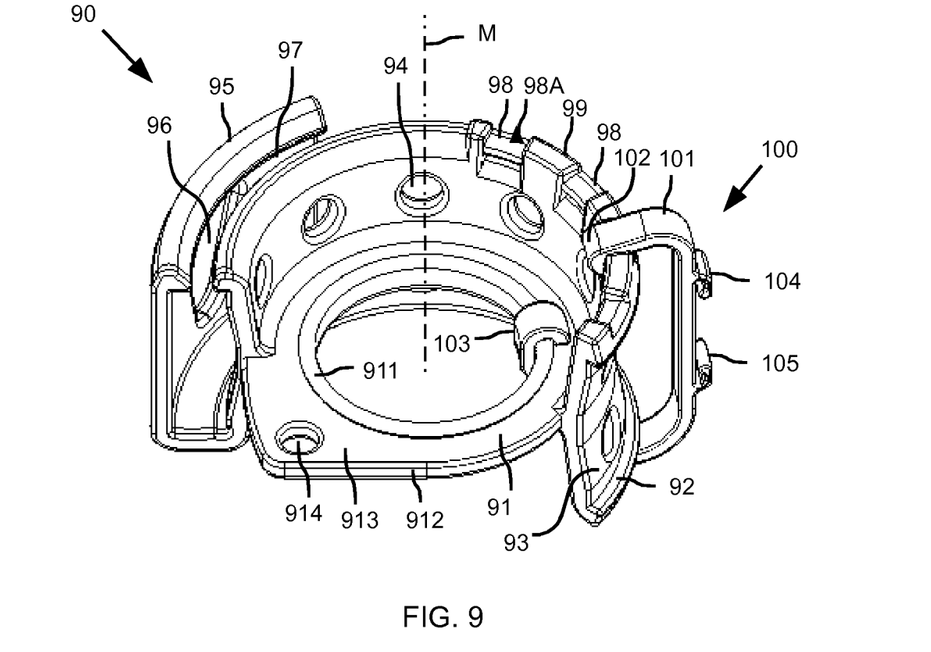
FIG. 9 shows a three-dimensional view of the cable fixing device for the container handling system according to the first embodiment.
Figure 10:
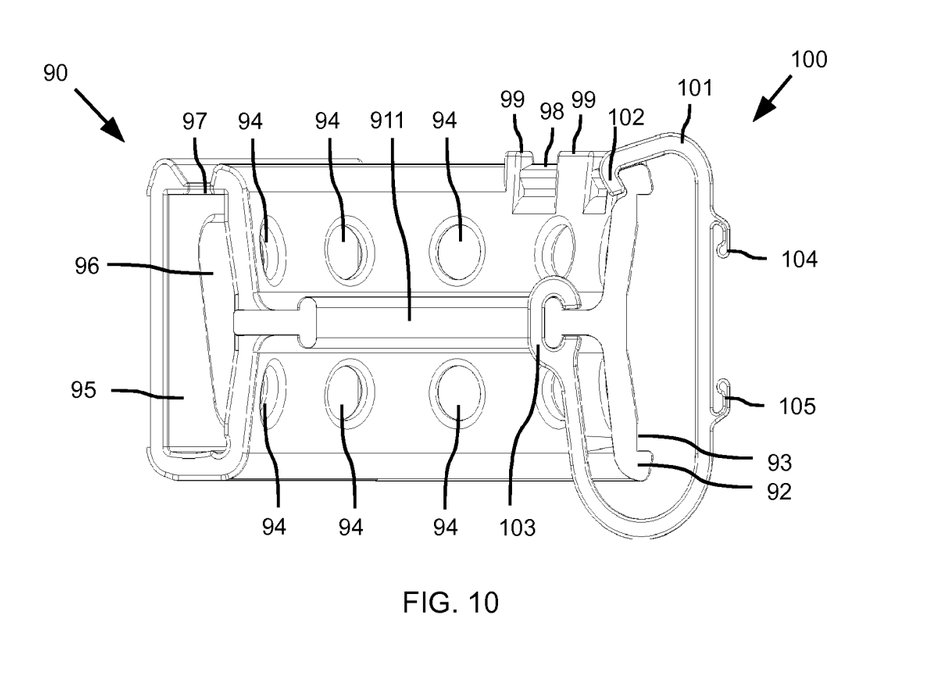
FIG. 10 is a sectional view of the cable fixing device of FIG. 9.

FIG. 9 and FIG. 10 show how the cable fixing device 90 according to the present embodiment is constructed for such a laying type. The cable fixing device 90 can be fabricated in any suitable manner, such as molding and/or three-dimensional printing, etc. For this, in particular plastic and/or metal and/or concrete and/or other suitable materials for laying cables are conceivable.

The cable fixing device 90 has a main body or base body 91 with a substantially annular cross section. The base body 91 has, on its inner opening, an inner ring 911 which surrounds the base body 91 along its entire inner opening. As a result, the inner ring 911 forms a bead at the inner opening of the base body 91. The bead and the inner opening of the inner ring 911 are approximately circular in the example of FIGS. 9 and 10.

A cable guide 92 is attached to the base body 91 on a part of its outer edge 912. The cable guide 92 is designed as a U-shaped trough, the bottom 93 of which is positioned as a partial ring around an annular axis M of the inner opening 911. As a result, the base body 91 and the cable guide 92 or their bottom 93 form a T-shape in cross section, as can best be seen in FIG. 10.

A plurality of openings 94 are positioned in the bottom 93 of the cable guide 92, which, for the sake of a clear illustration in FIGS. 9 and 10, are not all provided with a reference number. Some of the openings 94 are positioned in a first row along the circumference of the cable fixing device 90. Another portion of the openings 94 are positioned in a second row along the circumference of the cable fixing device 90. The first and second rows of openings 94 are positioned approximately parallel to one another. In each of the rows, in the example of the cable fixing device 90 of FIG. 9, the openings 94 are positioned at an equidistant space from one another along the circumference of the cable fixing device 90. The bottom 93 is thus configured as a perforated strip with two rows of holes formed by the openings 94.

Since the outer edge 912 of the base body 91 is positioned on the center line of the bottom 93 of the cable guide 92, the first and second rows of openings 94 are positioned on two opposite sides of the base body 91 and the inner ring 911.

The cable guide 92 encloses or wraps around only part of the outer edge 912 of the base body 91. The exposed part of the outer edge 912 of the base body 91 comprises a nose-shaped projection 913 with a through opening 914. In addition, a cover 95 is provided at one end of the cable guide 92, which is also configured as a U-shaped trough. An opening 96 is provided in the bottom of the U-shaped cover 95. In addition, the inside of the bottom 93 of the U-shaped cable guide 92 and the inside of the bottom of the U-shaped cover 95 face one another. Herein, the cable guide 92 and the cover 95 are connected to one another in such a way that they form a hollow profile that is open on three sides. As a result, the connecting cable 80 can be inserted into a cable insertion opening 97 in the direction of the ring axis M and then protrude from the hollow profile on two opposite sides of the hollow profile. The hollow profile has an essentially rectangular cross section. However, the cover 95 is not absolutely necessary. Alternatively, instead of the cover 95, it is also possible to produce at this position at least one fixation of the connecting cable 80 and the cable fixing device 90 to one another by means of clips 100 or cable ties. However, this may increase the number of clips 100 or cable ties required and the expense for assembling the connecting cable 80 and the cable fixing device 90 to one another.

On an outer edge of the cable guide 92, recesses 98 and protrusions 99 are alternately provided, which are used to fix a clip 100. For the sake of clarity, not all recesses 98 and protrusions 99 are provided with a reference sign in FIG. 9. Depending on which of the recesses 98 the clip 100 is fastened in, the size of the wrap angle of the connecting cable 80 and the cable fixing device 90 is set. The plurality of recesses 98 and protrusions 99 thus enables a variable setting of the wrap angle of the connecting cable 80 and the cable fixing device 90. For this purpose, it is optionally possible for the recesses 98 to be provided with a marking 98A to indicate the wrap angle. Herein, in addition to a direct specification of the wrap angle, it is conceivable not to specify the wrap angle directly but instead to identify or code with the marking 98A a position on the cable fixing device 90 that can be linked to a wrap angle. For this purpose, the recesses 98 can be numbered and/or coded as marking 98A. The marking 98A can be implemented, for example, as numbering from 1 to x in order to identify different positions on the cable fixing device 90. The coding can include a bar code, etc., for example. In addition or as an alternative to the mentioned numbering or coding, the marking 98A can be implemented in terms of color, haptic, etc. The assembly of the cable fixing device 90 can thus be made easier for an assembly fitter.

As can be seen from the synopsis of FIGS. 9 and 10, the clip 100 has a C-shaped base body 101 which has hooks 102, 103 at both of its ends. The shape of the hook 102 is adapted to the recesses 98. The hook 103, on the other hand, is C-shaped. Herein, the opening of the C-shaped hook 103 faces the opening of the C-shaped base body 101. As a result, when the clip 100 is mounted on the cable fixing device 90, the hook 103 can grip around the bead-shaped inner ring 911 of the cable fixing device 90 when the hook 102 engages in one of the recesses 98.

In addition, the C-shaped base body 101 has two brackets 104, 105, between which an element can be clamped to the base body 101, such as a label or identification label, etc.

To mount the cable fixing device 90 on the connecting cable 80, as previously described with reference to FIGS. 3 to 8, the connecting cable 80 is inserted into the cable insertion opening 97 so that the connecting cable 80 on the cable guide 92 is covered by the cover 95. Herein, one plug device 81 of the connecting cable 80 protrudes from the cable fixing device 90 in such a way that the plug device 81 rests laterally on the nose-shaped projection 913. The plug device 81 can be fastened in the position on the projection 913 of the cable fixing device 90 with a cable tie which is guided through the through opening 914. As a result, a strain relief can be realized.

Apart from that, the connecting cable 80 is laid along the cable guide 92 around the cable fixing device 90 and fastened in its position on the bottom 93 with the clip 100. As a result, the connecting cable 80 abuts or rests partially on the cover 95 or the cable guide 92 at the end of the cable guide 92 provided with the cover 95. In contrast, the connecting cable 80 is fixed to the bottom 93 with the clip 100, in particular by clamping or by pre-springing, at the exposed end of the cable guide 92. As an alternative or in addition to the clip 100, at least one cable tie can be used.

Figures 7, 8:
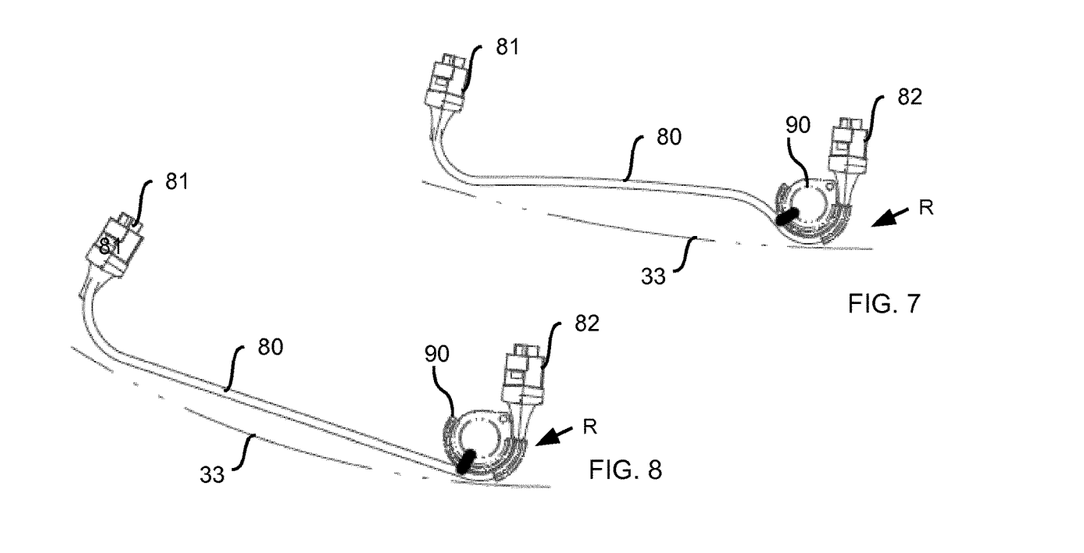

In this way, the cable fixing device 90 enforces the minimum bending radius for the connecting cable 80 on the plug device 81 of the connecting cable 80. As a result of this forced guidance, the connecting cable 80 can be laid in loop form between the drive devices 332 of FIG. 2 or the drive devices 18, 19 of the machine 10 of FIG. 1 or the drive devices 26, 27 of the machine 20 of FIG. 1, as shown in FIGS. 3 to 8 shown. The size of the loop changes depending on the size of the machine 10, 20, 30 and the resulting distances between the individual drive devices. Herein, a maximum in laying is also possible, as shown in FIG. 8, in which the loop formed by the cable 80 is minimal. In addition, the loop is made by varying the wrap angle or wrap circumference, which is present between cable fixing device 90 and connecting cable 80.

Depending on requirements, the cable fixing device 90 can be specially produced for the intended wrap angle or wrap circumference. For this purpose, in particular the length of the cable guide 92 and/or the positioning of the recesses 98 and protrusions 99 on the edge thereof are/is adjusted as desired. However, it is alternatively possible that the cable fixing device 90 comprises a universally set wrap angle or wrap circumference and that the respectively desired wrap angle or wrap circumference in assembling the cable fixing device 90 is specially set by the position of the clip 100 on the cable fixing device 90.

The cable fixing device 90 is configured in such a way that the cable fixing device 90 only uses itself and the connecting cable 80 for fixing and maintaining the function. The cable fixing device 90 uses the described integrated clamping on the connecting cable 80 for this purpose. It is therefore not necessary to fasten the connecting cable 80 and/or the cable fixing device 90 to the associated machine 10, 20, 30 or to its drive device.

Figure 11:
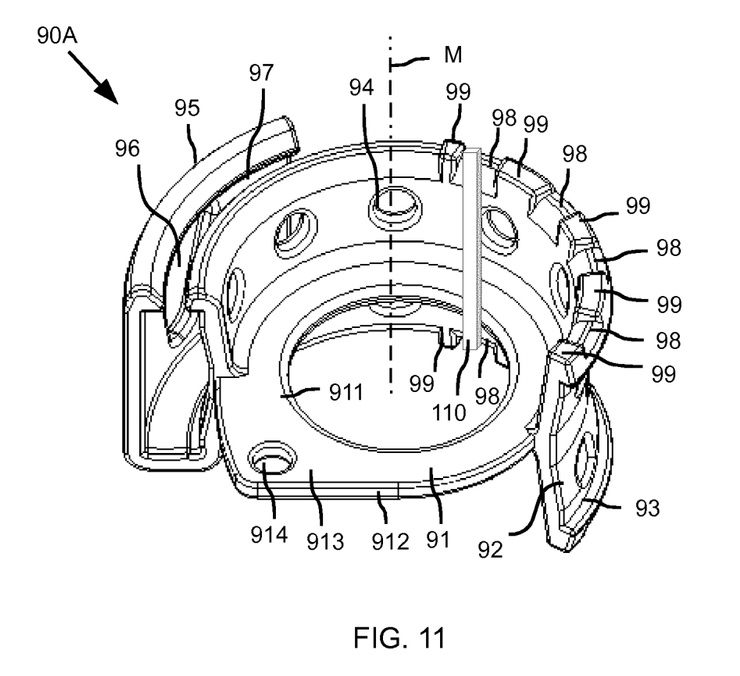
FIG. 11 is a three-dimensional view of a cable fixing device for the container handling system according to a second embodiment.

FIG. 11 illustrates a cable fixing device 90A according to a second embodiment. In contrast to the cable fixing device 90 according to the first embodiment, the cable fixing device 90A has recesses 98 and protrusions 99 on both edges of the cable guide 92. As a result, a cable tie 110, which is guided through the inner ring 911 and around the cable guide 92 back to the inner ring 911, can be securely fixed in the recesses 98 in order to define the wrap angle of the connecting cable 80 and the cable fixing device 90. Instead of the at least one cable tie 110, a C-shaped clip can alternatively be used, which is fastened to the recesses 98 which are positioned in the cable fixing device 90A on the two edges of the cable guide 92 in a line in the direction of the M axis.

Figure 12:
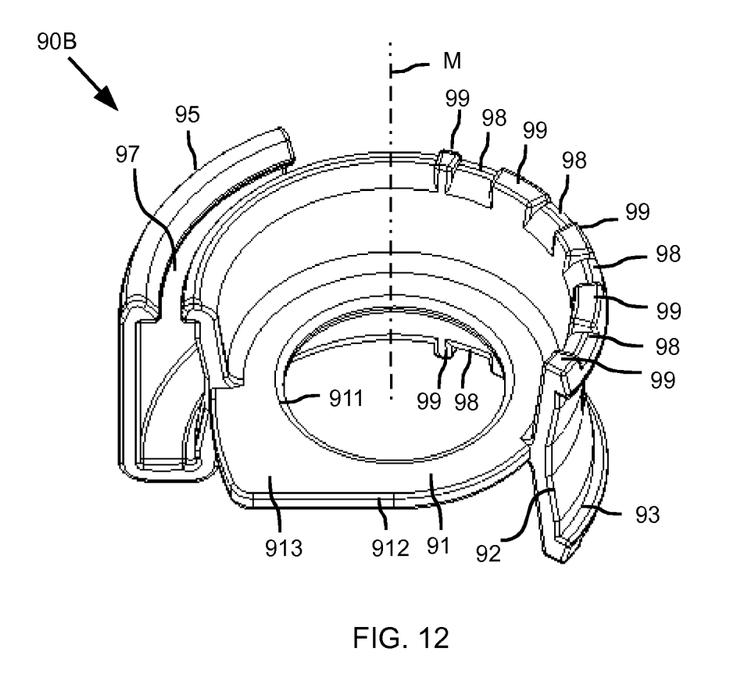
FIG. 12 is a three-dimensional view of a cable fixing device for the container handling system according to a third embodiment.

FIG. 12 illustrates a cable fixing device 90B according to a third embodiment. In contrast to the cable fixing device 90A according to the second embodiment, the cable fixing device 90B has no openings 94, 96 and no through opening 914. In this case, the fastening of the connecting cable 80 to the cable fixing device 90B using the recesses 98, as described above, realizes the definition of the wrap angle and a strain relief.

Figure 13:
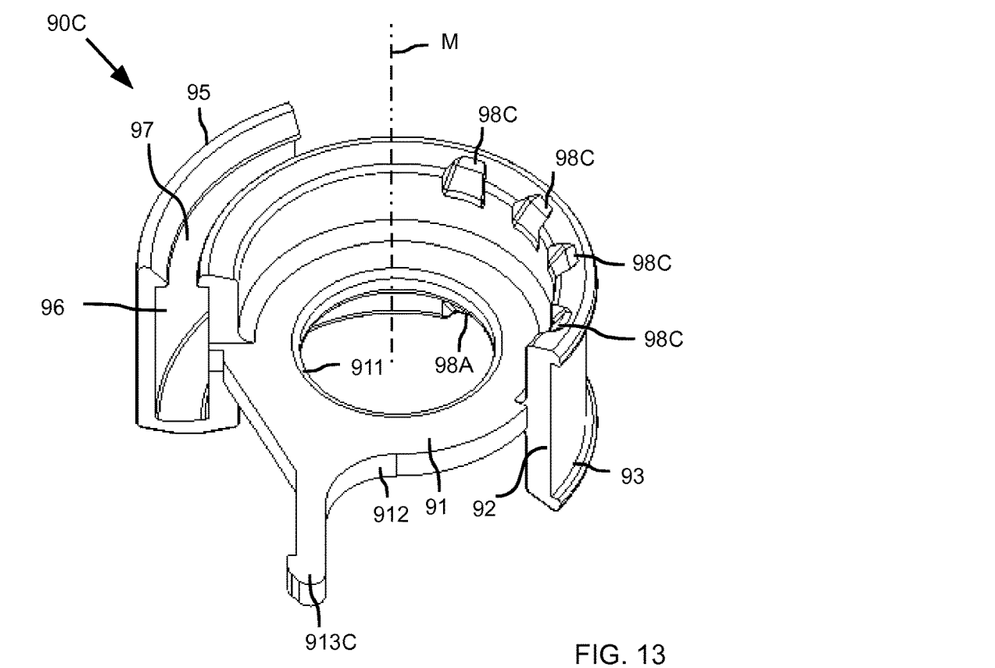
FIG. 13 is a three-dimensional view of a cable fixing device for the container handling system according to a fourth embodiment.

FIG. 13 illustrates a cable fixing device 90C according to a fourth embodiment. In contrast to the cable fixing device 90B according to the third embodiment, the cable fixing device 90C comprises no recesses 98 on the outer edge of the cable guide 92 and no openings 94. Instead, the cable fixing device 90C has recesses 98A, which are provided in the bottom 93 of the cable guide 92 and face the inner ring 911. The recesses 98A are designed as notches which are suitable for engaging a clip or for passing a cable tie 110 (FIG. 11) in order to attach the connecting cable 80 to the cable fixing device 90C and thus define the wrap angle. In addition, strain relief can be realized with this and with a hook-shaped projection 913C which can engage in one of the plug devices 81, 82.

Figure 14:
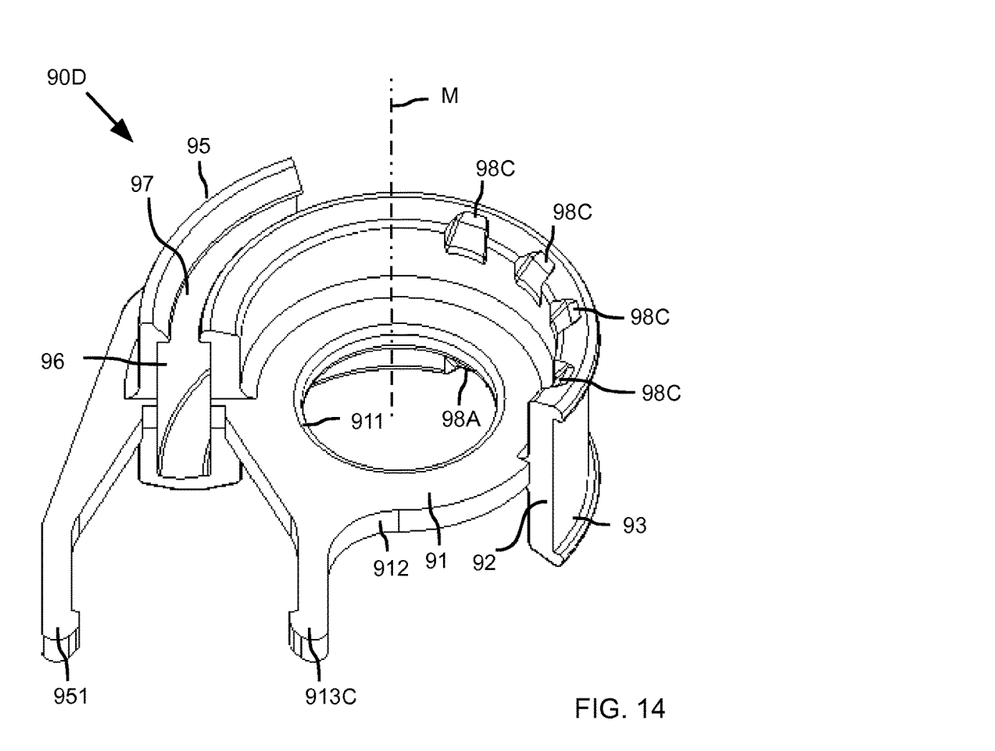
FIG. 14 is a three-dimensional view of a cable fixing device for the container handling system according to a fifth embodiment.

FIG. 14 illustrates a cable fixing device 90D according to a fifth embodiment. In contrast to the cable fixing device 90C according to the fourth embodiment, the cable fixing device 90D comprises another hook-shaped projection 951 which protrudes from the cover 95. The hook-shaped ends of the projections 951 and 913C face one another and are spaced apart such that one of the plug devices 81, 82 can be mounted between them, so that the hook-shaped ends of the projections 951 and 913C can engage in these plug devices 81, 82. Thus, a further fixation for strain relief can be realized.

Figures 15, 16:
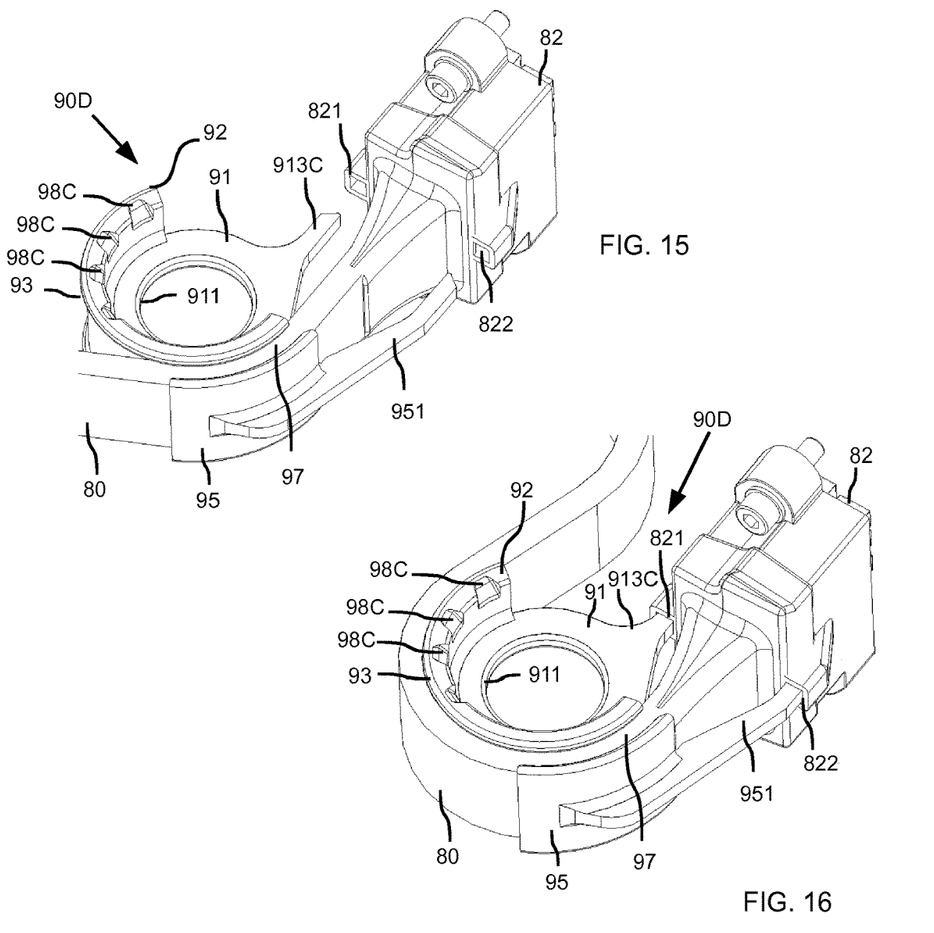
FIG. 15 and FIG. 16 show two different steps for assembling the cable fixing device of FIG. 14 and a connecting cable to one another.
Figure 17:
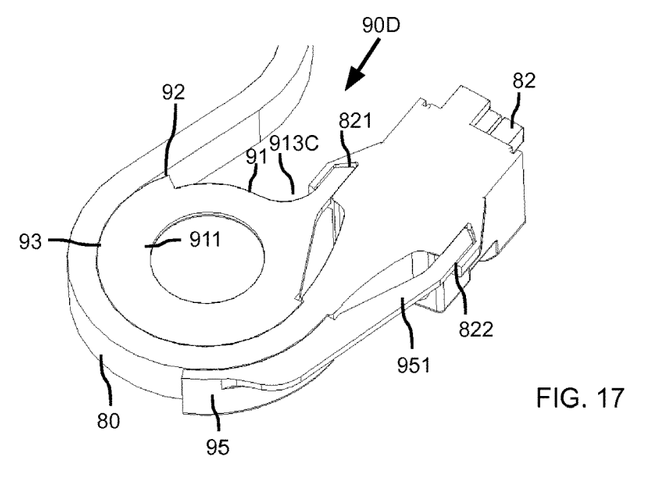
FIG. 17 is a sectional view of the assembled unit of FIG. 16.

As shown in FIG. 15, the connecting cable 80 is inserted into the opening for this purpose, so that, for example, the second plug device 82 is positioned adjacent to the projections 951 and 913C. The second plug-in device or plug device 82 has two coupling devices 821, 822 in the form of, in particular, blind holes on its side facing the cable of the connecting cable 80. The coupling devices 821, 822 are adapted to the shape of one of the projections 951, 913C. As a result, the projection 913C can be detachably coupled to the coupling unit 821 and the projection 951 can be detachably coupled to the coupling device 822, as illustrated in FIGS. 15 and 16.

In particular, the projection 913C forms a snap connection with the coupling unit 821, whereas the projection 951 forms a snap connection with the coupling device 822.

Alternatively, it is possible to design the projections 951, 913C as parts of the plug device. In this case, the coupling devices 821, 822 are provided on the cable fixing device 90D, in particular on the cable guide 92 and the cover 95.

All of the above-described implementations of the container handling system 1, the cable fixing device 90 and the method that can be carried out therewith can be used individually or in all possible combinations. The features of the embodiments and/or their options can be combined with one another as desired. In addition, in particular the following modifications are conceivable.

The elements shown in the figures are depicted schematically and can differ in the specific implementation from the forms shown in the figures provided that the above-described functions are ensured.

The container handling system 1 of the embodiments can be a disposable system or a reusable system. In a reusable system, containers 2 are produced which are collected again after the product filled therein has been emptied from container 2 and, after cleaning, are reused to fill in a new product. In contrast to a reusable system, a single-use system produces containers 5 which, after the product filled therein has been emptied, are no longer reused for filling with a new product.

In addition, for example, the first container handling machine 10 can have a blow molding machine unit, a filling machine unit, a labeling machine unit, etc. positioned directly in a row one behind the other, so that the containers 2 can each be transported from the preceding machine unit to the following machine unit by means of a transport device (not shown).

LIST OF REFERENCE SIGNS

1 container handling system
5 container
3 label
4 printing
10 first container handling machine, filling machine
15, 35, 45, 70, 3320 control device
16, 18, 19 drive device
17 filling tank
20 second container handling machine, capper
26, 27, 34, 56, 66 drive device
30 third container handling machine, equipment machine, labeling machine and/or printing machine
33 transport carousel
36 up to 39 module, equipment module
40 fourth container handling machine, packing machine
50 first transport device
60 second transport device
80 connecting cable
81, 82 first and second plug device
90, 90A, 90B, 90C, 90D cable fixing device
91 base body
92 cable guide
93 bottom
94, 96 opening
95 cover
97 cable insertion opening
98, 98C recess
98A marking
99 protrusion
100 clip
101 C-shaped body
102, 103 hook
104, 105 bracket
331 turntable
331A motor shaft
331B sealing ring(s)
332 turntable direct drive device
333 centering bell
821, 822 coupling device
911 inner ring
912 outer edge
913, 913C, 951 projection
914 through opening
B carousel axis
D turntable axis
M ring axis
R minimum bending radius
TR transport direction Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

What is claimed is:

1. A cable fixing device for a container handling system, comprising:
   a base body,
   a cable guide which is positioned around a part of the base body, and
   a cover for covering an end of the cable guide in such a way that a connecting cable, which is pre-assembled with a plug device at each one of its both ends, can be introduced between the cover and the cable guide,
   wherein the cable guide is configured at its other end for fixing of the connecting cable in such a way that a wrap angle of the cable fixing device and the connecting cable can be set variably.

2. The cable fixing device according to claim 1, wherein the base body and the cable guide have a shape which enforces a minimum bending radius of a connecting cable guided in the cable guide in case the cable fixing device and the connecting cable are fixed to each other.

3. The cable fixing device according to claim 1,
   wherein the base body comprises an inner ring, and/or
   wherein the cable guide for setting the wrap angle comprises at least one recess for accommodating a clip or a cable tie for fixing the cable fixing device and the connecting cable to one another, and/or wherein at least one recess for accommodating the clip or the cable tie comprises a marking to indicate the wrap angle.

4. The cable fixing device according to claim 3, wherein a through-opening is provided in the nose-shaped projection.

5. The cable fixing device according to claim 1, one of the preceding claims, wherein the base body has a nose-shaped projection or a hook-shaped projection for the cable fixing device to rest on one of the plug devices for strain relief.

6. The cable fixing device according to claim 1, wherein the cable fixing device is built up in layers.

7. A container handling system, comprising
at least one container handling machine for handling containers using at least two drive devices,
at least one cable fixing device which comprises,
a base body,
a cable guide which is positioned around a part of the base body, and
a cover for covering an end of the cable guide in such a way that a connecting cable, which is pre-assembled with a plug device at each one of its both ends, can be introduced between the cover and the cable guide,
wherein the cable guide is configured at its other end for fixing of the connecting cable in such a way that a wrap angle of the cable fixing device and the connecting cable can be set variably,
wherein the at least one cable fixing device is mounted on a connecting cable for connecting the at least two drive devices.

8. The container handling system according to claim 7, wherein the at least two drive devices are spaced from one another in a predetermined range,
wherein a plug device is pre-assembled to each of the two ends of the connecting cable which connects two drive devices, and
wherein a cable fixing device is fixed to the connecting cable at least one of the plug devices in order to create a loop in the connecting cable between the plug devices.

9. The container handling system according to claim 7, wherein the at least one container handling machine comprises one or more of a blow molding machine, a filling machine, a closer, an equipping machine, or an inspection machine.

10. A method for setting a minimum bending radius for a connecting cable of a container handling system, wherein the connecting cable is pre-assembled with a plug device at each one of its both ends, in order to drive two drive devices of the container handling system, which are spaced apart from one another in a predetermined range, the method being carried out with a cable fixing device which comprises a base body, a cable guide and a cover and wherein the method comprises the steps of inserting the connecting cable at one of its two ends between the cover and the cable guide, which is suitably covered at one end by the cover for the insertion of the connecting cable and is at least partially positioned around the base body, and
fixing the other end of the cable guide and the connecting cable to one another such that a wrap angle of the cable fixing device and the connecting cable are set variably.

11. The method according to claim 10, wherein the step of fixing creates a loop in the connecting cable between the plug devices.

* * * * *